UNITED STATES PATENT OFFICE.

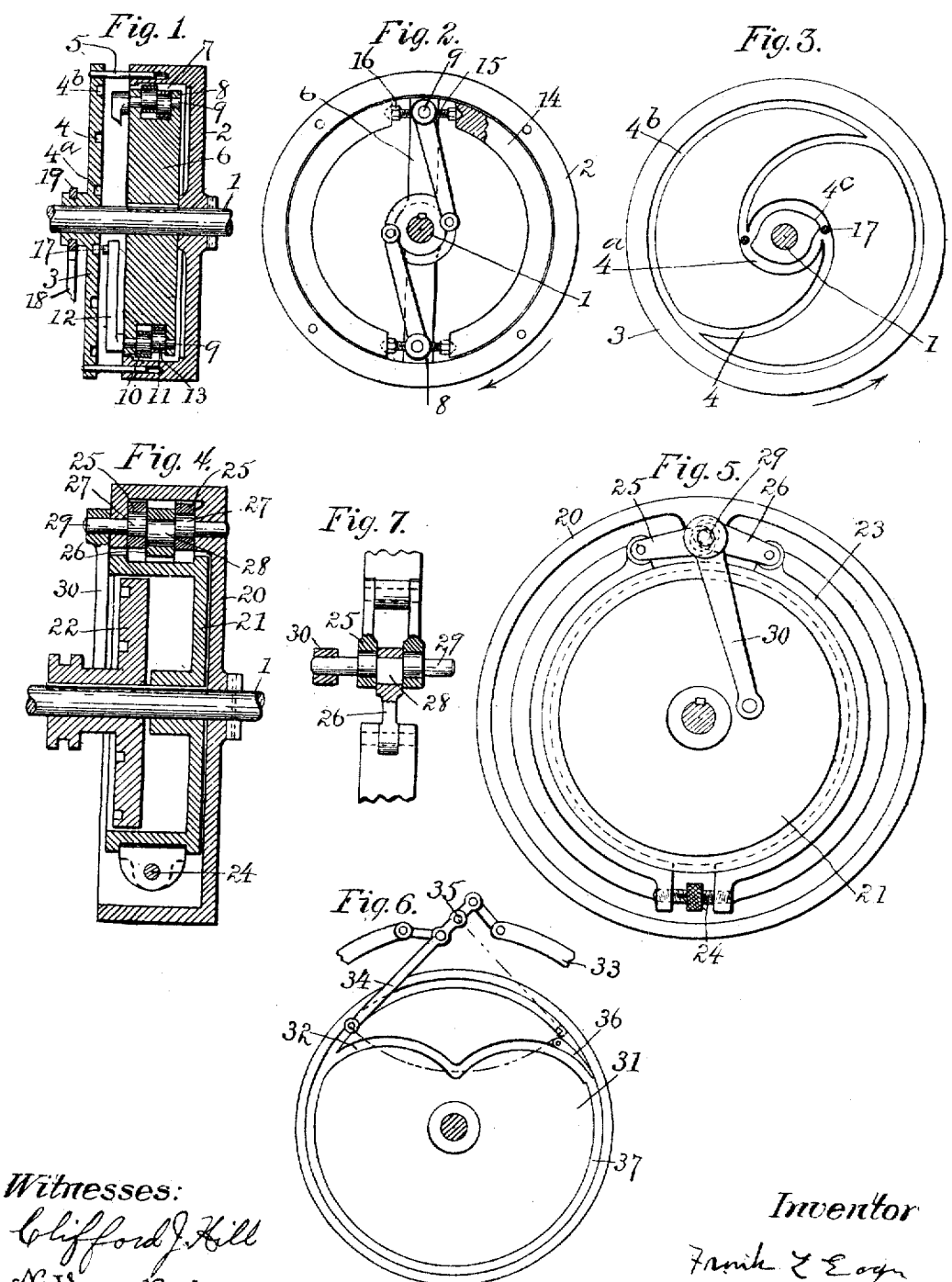

FRANK L. EAGER, OF WATERBURY, CONNECTICUT.

CLUTCH.

No. 829,003.　　　　Specification of Letters Patent.　　　Patented Aug. 21, 1906.

Application filed February 24, 1905. Serial No. 247,103.

*To all whom it may concern:*

Be it known that I, FRANK L. EAGER, a citizen of the United States, and a resident of Waterbury, in the county of New Haven and State of Connecticut, have invented a new and Improved Clutch, of which the following is a specification.

My invention relates to that class of devices in which the movement of a driving member is conveyed to mechanism to be driven thereby, or what may be termed the "driven" member, which latter mechanism may be disconnected at will from the driving member, and the improvement relates more especially to that class of clutches known as "friction-clutches," or one in which the connection between the driving member and the driven member is obtained through the medium of friction devices.

The object of my invention is to provide a device of this class in which the connection between the driving member and the driven member shall be sure and effective and one in which the motion to the driven member shall not be imparted too suddenly, the driven member gradually taking up the motion of the driving member; and a further object of the invention is to provide a device of this class in which the clutch action between the driving and driven members shall depend upon the rate of movement of the latter as compared with the former; and a further object of the invention is to provide a device in which the amount of friction between the driving and driven members required to operate the device shall depend upon the load placed upon or in opposition to movement of the driven member; and a still further object of the invention is to provide a device of this class that shall prevent an excessive amount of power, sufficient to strain or break the parts, to be applied to the driven member under excessive loads or opposition to movement applied to the latter. A form of mechanism in the use of which these objects may be obtained is illustrated in the accompanying drawings, in which—

Figure 1 is a view in central longitudinal section through a device embodying my invention. Fig. 2 is a face view looking into the clutch and with the cam-plate removed, parts being broken away to show construction. Fig. 3 is a face view of the cam. Fig. 4 is a view in central longitudinal section through a device, showing another embodiment of my invention. Fig. 5 is a face view looking into the clutch of this latter form and with the cam-plate removed. Fig. 6 is a face view of still another form of cam and illustrating the operation of this form of mechanism.

In the accompanying drawings the numeral 1 denotes a shaft, as a counter-shaft, which is to be driven from any suitable source of power applied as through a pulley or drum 2. This pulley or drum is mounted to rotate freely on the shaft and may be driven by any suitable means, as by a belt passing around the outer surface thereof. A cam-plate 3 is also mounted on the shaft to have rotation independent thereof, and this cam-plate is provided with cam-grooves 4. The cam-plate is connected with the pulley or drum 2 as by means of pins 5, arranged about the drum in any desired number and preferably secured thereto, these pins passing through openings in the cam-plate to afford sliding movement of the latter upon said pins. A spider 6 is keyed to the shaft and is preferably of the form shown in Fig. 2 of the drawings, having two arms arranged on diametrically opposite sides of the shaft and extending radially therefrom. Each of these arms is provided at its outer end with a recess 7, forming bearings 8 for the eccentric-pins 9. Each of these pins bears eccentrics 10 and 11, arranged in opposition to each other, and a lever 12 is secured to each of the eccentric-pins 9.

Straps 13 pass around the eccentrics, and each of these straps is connected with one end of a clutch-shoe 14, as by means of a link 15. Two of the shoes 14 are preferably provided, as shown in Fig. 2 of the drawings, and these shoes may be connected with the links 15 or supported thereby in any suitable manner. These links are secured to the straps on the eccentrics in any suitable manner and are screw-threaded to engage adjusting-nuts 16, by means of which the position of the shoes 14 to properly engage the pulley or drum 2 may be determined. Each of the levers 12 bears a stud 17, adapted to engage the cam-groove 4. A lever 18, pivotally supported in any well-known manner and engaging a collar 19, located in a groove on the cam-plate 3, may be employed to move the cam-plate to cause the stud 17 to engage within the grooves therein.

In the operation of the device, the parts being in the position shown in Figs. 1 and 2, the studs 17 on the levers 12 will lie normally opposite a concentric groove 4ᵃ, located near the center of the cam-plate. As the cam-plate is moved toward the pulley or drum 2 the studs 17 enter the groove 4ᵃ, and, the cam-plate and pulley traveling in the direction indicated by the arrows in Figs. 2 and 3, as the cam-grooves 4, leading from the groove 4ᵃ, are moved in the rotation of the cam-plate they pass along each of the studs 17, causing the levers 12 to be swung away from the shaft. This swinging movement of the levers causes the eccentrics 10 and 11 to be turned in opposition to each other, and the shoes 14 are caused to frictionally engage the inner surface of the pulley or drum 2. The spider 6, and consequently the shaft 1, gradually acquires the movement of the pulley or drum 2, and when the spider has acquired the same rate of rotation as the drum further outward movement of the levers 12 will cease. It will be seen that should more load be placed upon the shaft 1 to oppose its movement there will be a tendency of said shaft to lag in its movement, and consequently the cam-plate will travel slightly faster and cause the arms 17 to be thrown farther outward until the spider acquires the same rate of movement as the cam-plate and pulley.

The adjustment of the adjusting-nuts 16 may be such that when the levers 12 are thrown outward far enough for the concentric groove 4ᵇ near the outer surface of the drum or pulley to engage the stud 17 the pulley or drum will slide upon the shoes 14 should an excessive load be applied to the shaft 1. It will thus be seen that in the application of an excessive load to the shaft 1 the outward movement of the levers 12 is limited, so that injury to the parts will not result in case of the application of an excessive load to the shaft 1, the drum or pulley 2 merely rotating and slipping upon the shoes 14.

In the form of device shown in Figs. 4 and 5 of the drawings the pulley or hub 20 is mounted to rotate loosely upon the shaft 1, as hereinbefore described. The spider 21 and the cam-plate 22, however, are keyed to the shaft, the latter having its cam-grooves facing outward and its hub engaging a spline on the shaft, so that while the cam-plate and shaft are compelled to rotate together the former may have a sliding movement longitudinally of the latter. In this form of device a friction-band 23 is borne on the inner surface of the drum or pulley 20. This band is preferably made in two sections, two ends of which are joined, as by means of an adjusting-stud 24, having oppositely-arranged threads engaging threaded sockets in the band. The opposite ends of the bands have links 25 and 26 connecting them with eccentrics 27 and 28, located on the eccentric-pin 29, located in bearings in the drum, as shown in Fig. 4 of the drawings. A lever 30 is secured to the eccentric-pin 29 and has a stud located opposite the cam-groove in the plate 22, as hereinbefore described with reference to Figs. 1, 2, and 3. The cam-grooves in this plate may be arranged in any desired manner to cause the lever 30 to be swung away from the shaft. For instance, a single cam-groove, as indicated at 4 in Fig. 3 of the drawings, may be employed and the concentric grooves located near the shaft and near the outer surface of the cam-plate, as shown in Fig. 3, may be employed.

In Fig. 6 of the drawings another form of cam-plate 31 is shown, the cam-grooves 32 in this form being of heart shape. A friction-band 33 may be employed, operated by a lever 34, pivoted to the pulley or drum, as by means of a pin 35. In this form of device the friction-band 33 is connected to the lever 34 on opposite sides of the pin 35, and by the movement of the lever caused by the cam-groove 32 the band is compressed upon the spider in the same manner as in the device illustrated in Fig. 4 of the drawings. In this form of the device a pawl 36 is employed to close the opening into the cam-groove 32 at one end, so that in the rotation of the cam in one direction when the stud on the lever 34 has entered the concentric groove 37 it will still be located in this groove, but is free to pass out of the groove 32 into the concentric groove 37 at this end of the cam-groove.

It will be understood that different forms of adaptation of this invention may be employed than those herein shown without departing from the scope or intent of the invention, and I do not desire or intend to limit my invention to the precise means herein shown and described for carrying the same into effect, as any mechanism having the objects herein stated will be deemed to come within the scope and intent of my invention.

To aid the movement of the studs 17 on the levers 12 from the groove 4ᵃ into the cam-grooves 4 as the cam-plate is rotated, a lead may be provided in the groove 4ᵃ at or near the entrance to the cam-groove, this lead being provided by inclining a wall or walls of the concentric groove toward the cam-groove, as shown at 4ᶜ in Fig. 3 of the drawings. It will be obvious that instead of providing this lead a pawl may be provided, as shown in Fig. 6 of the drawings.

What I claim as my invention, and desire to secure by Letters Patent, is—

1. A driven member, a driving member mounted to rotate freely thereon and including a disk with a flange constituting the rim thereof and forming a recess, a spider keyed to the driven member and located within said recess, a friction device located within said recess and adapted to engage one of said members, a lever for operating the friction device, a cam-plate having cam-grooves to engage said lever and forming a cover to completely inclose said recess, and means for operating the cam-plate.

2. A driven member, a driving member mounted to rotate freely thereon and including a disk with a flange constituting the periphery and forming a recess therein, an arm projecting radially from the driven member and secured thereto, a friction-ring to engage the inner surface of the driving member, an eccentric mounted on said arm to operate the ring, a lever to operate the eccentric, and a cam-disk to close said recess and having a cam-groove to engage and operate said lever, and means for operating the cam-disk.

3. A driven member, a driving member mounted to rotate freely thereon and including a disk with a flange constituting the periphery thereof and forming a recess, an arm secured to the shaft and extending radially therefrom, a friction-band supported by said arm, oppositely-disposed eccentrics in engagement with the ends of the friction-band, a lever for operating the eccentrics, a cam-plate forming a cover for the recess in the driving member and having cam-grooves to engage said lever, and means for operating the cam-plate.

4. A driven member, a driving member, and a spider mounted thereon, one of said parts being keyed to the driven member, a friction device borne by one of said parts and adapted to engage the opposite part, a lever for operating the friction device, a cam-plate having a groove to engage said lever, means for moving the cam to engage said lever, and means for positively limiting the extent of outward movement of the lever, whereby a predetermined pressure between the parts is obtained.

5. A driven member, a driving member and a spider mounted thereon, one of said parts being keyed to the driven member, a friction device borne by one of said parts and adapted to engage the opposite part, a lever for operating the friction device, a cam-plate having a groove, means for positively limiting the outward movement of the lever and retaining it in said position whereby a predetermined pressure between the parts is obtained, and means for moving the cam-plate to operatively engage the lever.

6. A driven member, a driving member and a spider mounted thereon, one of said parts being keyed to the driven member, a friction device borne by one of said parts and adapted to engage the opposite part, a lever for operating the friction device, a cam-plate having a radially-arranged cam-groove, means for positively limiting the outward movement of the lever and for retaining it in said position whereby a predetermined pressure between the parts is obtained, and means for moving the cam-plate to operatively engage the lever.

7. A driven member, a driving member mounted to rotate thereon, a spider secured thereto, a friction device borne by one of said last-mentioned parts and adapted to engage the opposite member, an eccentric for operating said friction member, a lever to operate the eccentric, a cam having a concentric groove to engage said lever and a cam-groove to operate it and means for operating the cam.

8. A driven member, a driving member mounted to rotate thereon, a spider keyed thereto, a friction-band mounted on the spider to engage the driving member, an eccentric for operating said band, a lever for operating the eccentric, a cam-plate having two concentric grooves and a cam-groove joining the concentric grooves, said grooves adapted to engage the lever to operate the friction-band.

FRANK L. EAGER.

Witnesses:
CLIFFORD J. HILL,
NATHAN BERKVIRTZ.